United States Patent [19]

Yalamanchili

[11] Patent Number: 5,685,091
[45] Date of Patent: Nov. 11, 1997

[54] SEALED WATERPROOF FOOTWEAR

[75] Inventor: Seshamamba Yalamanchili, New Castle, Del.

[73] Assignee: W. L. Gore & Associates, Inc., Newark, Del.

[21] Appl. No.: 305,473

[22] Filed: Sep. 13, 1994

[51] Int. Cl.⁶ .................................................. A43B 23/07
[52] U.S. Cl. ................................................. 36/55; 36/10
[58] Field of Search ................................. 36/55, 45, 14, 36/10, 84

[56] References Cited

U.S. PATENT DOCUMENTS

| | | | |
|---|---|---|---|
| 2,533,453 | 4/1950 | Gottschalk | 36/10 |
| 2,724,676 | 11/1955 | Randall et al. | 154/139 |
| 3,581,412 | 6/1971 | Dalebout | 36/2.5 |
| 3,627,567 | 12/1971 | Tensho | 117/76 T |
| 4,194,041 | 3/1980 | Gore et al. | 428/315 |
| 4,508,582 | 4/1985 | Fink | 36/45 X |
| 4,599,810 | 7/1986 | Sacre | 36/55 |
| 4,707,874 | 11/1987 | Champagne | 12/142 E |
| 4,814,412 | 3/1989 | Crowther et al. | 528/28 |
| 4,819,345 | 4/1989 | Mulcahy et al. | 36/55 X |
| 4,899,465 | 2/1990 | Bleimhofer et al. | 36/14 |
| 4,901,450 | 2/1990 | Chemello et al. | 36/10 |
| 5,253,434 | 10/1993 | Curley, Jr. et al. | 36/55 |
| 5,289,644 | 3/1994 | Driskill et al. | 36/14 |
| 5,433,987 | 7/1995 | Peterson et al. | 36/44 X |

FOREIGN PATENT DOCUMENTS

| | | | |
|---|---|---|---|
| 1228239 | 8/1960 | France . | |
| 2576195 | 7/1986 | France . | |
| 1096324 | 1/1961 | Germany . | |
| 2854464 | 7/1980 | Germany | 36/45 |
| 2711579 | 7/1981 | Germany . | |
| 8717201 | 5/1988 | Germany . | |
| 4311768 | 10/1994 | Germany . | |
| 2242607 | 10/1991 | United Kingdom . | |

*Primary Examiner*—B. Dayoan
*Attorney, Agent, or Firm*—Gary A. Samuels

[57] ABSTRACT

A waterproof footwear article is provided having a layer of a two component polyurethane system located above the insole board. The polyurethane system also may penetrate the connecting region between the insole board and footwear upper. A process of waterproofing a footwear article is also provided which includes the step of introducing a two component polyurethane system into the interior of the footwear article and optionally applying forces to cause the polyurethane system to penetrate the various article layers.

3 Claims, 10 Drawing Sheets

SEALED WATERPROOF FOOTWEAR

FIELD OF THE INVENTION

This invention relates to sealed waterproof footwear and the process for making existing footwear waterproof.

BACKGROUND OF THE INVENTION

The goal of achieving waterproof footwear has been the focus of study for many years. Many different techniques and materials have been developed in efforts to achieve this goal.

Perhaps the earliest efforts in this area concentrated on the use of rubber materials to be used in various areas of footwear to prevent water from entering the interior parts of shoes and boots. Footwear manufactured totally from rubber or other similar materials were constructed by dipping or molding the material directly onto a form such as a sock or other shoe form. The most successful footwear constructions utilizing the dipping and molding techniques did not allow for any separation between the upper and outer sole in achieving water impermeablility. These constructions however had poor fitting properties, were extremely heavy and while able to keep water out, were not able to prevent the buildup of water vapor inside the shoe thereby creating a damp and clammy feeling within the shoe over a period of wearing time. The dipping and molding techniques were also not readily adaptable to construction of various footwear styles.

More recently, the dipping and molding techniques have been modified to make the footwear more breathable. These articles of footwear consisted of uppers or shoe bodies having more breathable materials with soles made of rubber and other water impermeable materials. A major problem arose with these types of constructions however in that the connecting region between the waterproof sole and the upper became a major source of leakage as there was no effective way to make the connecting region waterproof.

An alternative approach to the goal of achieving a comfortable waterproof shoe involved employing a waterproof insert or bootie into the shoe. This waterproof insert, if constructed of appropriate materials had the additional advantage of being permeable to water vapor so that there was no buildup of water vapor within the shoe over the time when the shoe was being worn. While these inserts are very effective in keeping water and water vapor out, the construction of such shoes is complicated and expensive as the bootie must itself be properly constructed, the shoe must be separately constructed, and then the bootie must be properly integrated into the shoe.

Additional elements of the footwear article are also now under evaluation so as to be made waterproof. For example, the use of waterproof insole boards and the use of waterproof insole gasket strips comprising stiff, flexible non-woven polymeric materials coated with a continuous layer of a thermoplastic waterproof adhesive have been developed. These elements must be integrated into the article of footwear at the time of construction and are not suitable for retrograding the finished article.

Additional techniques have been developed to minimize water entry spots of footwear articles. For example, U.S. Pat. No. 5,289,644 by Driskill et al employs a polymeric binding attached to the edge of the upper that is lasted around a waterproof insole board. Durable waterproof seals are formed between the polymeric binder and the upper as well as between the polymeric binder and the insole board. The manufacture of these types of shoe is likewise complicated and expensive due to the control of the generation and size of pleats formed when the upper is lasted about the insole board and bonded thereto with the polymeric material. The waterproof seals created with the binder are also susceptible to damage when the outersoles are applied to the finished shoes. Moreover, this process requires integration of these binders at the time of construction and are not suitable for retrograding a finished footwear article.

An alternative approach to the creation of a waterproof shoe involves an injection molding process as taught in U.S. Pat. No. 4,899,465 to Bleimhofer et al wherein the footwear has a waterproof upper with an extended porous mesh area that is filled with the polyurethane material that is also used in the outer sole area. This injection mold process is expensive and due to the high mold costs has limited sole configurations. Similar to the binder process described above, this process requires waterproofing the shoe during the actual construction of the shoe and has no applicability in waterproofing a shoe that has already been constructed.

There has been limited research in the process of waterproofing a completed footwear article other than by treating the exterior of the finished article. A process as described in U.S. Pat. No. 4,707,874 to Champagne has been developed for treating the inside of a footwear article that requires use of a polymeric material dissolved in a solvent that is then used to produce a layer of waterproof material over the surface of selected areas of the article. This often requires an initial waiting period of 24 hours. The process further requires inverting the footwear article so that the solvent used in producing this layer may evaporate by drying. An extensive drying system is involved and requires a drying period of at least 12 hours and often up to 24 hours to allow the solvents to dry.

There is a need for an effective solvent-free waterproofing system for use with footwear articles that may have not been previously waterproofed.

SUMMARY OF THE INVENTION

This invention provides for a footwear article that is waterproof and the process for waterproofing a previously constructed footwear article. The footwear article rendered waterproof comprises an upper having lower regions that is lasted to the bottom side of an insole, a layer of a two component polyurethane material formed on the upper side of an insole and the connecting region of the upper and the sides of the insole, a footbed that is positioned over the layer of polyurethane material and an outer sole that is located below the insole.

The process of waterproofing a footwear article having an upper, an insole to which lower regions of the upper have been attached on the underside of the insole and an outersole on the lower side of the insole includes the steps of introducing a two component polyurethane material into the interior region of the shoe above the insole and forming a layer of waterproof material in at least the connecting region between the insole and the shoe upper, and inserting a footbed over the layer of waterproof material. The two component polyurethane system is a solvent free liquid polyurethane system. Techniques to force the polyurethane system into internal areas of footwear articles are also provided.

DETAILED DESCRIPTION OF THE PREFERRED EMBODIMENTS

Figure 1:
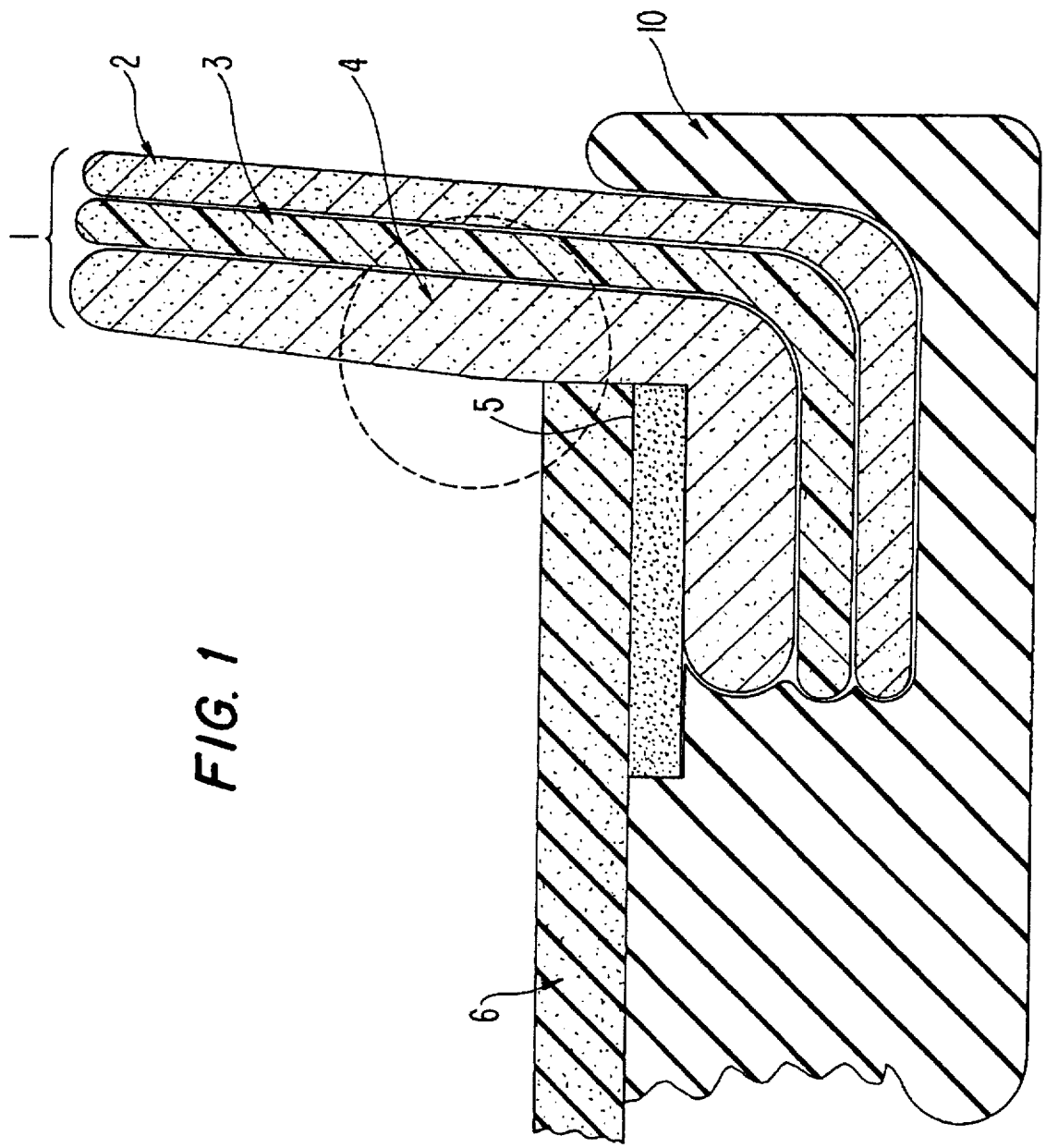
FIG. 1 is a schematic cross-sectional view of a footwear article prior to any treatment.

This invention provides for a finished footwear article with lasted uppers to be made waterproof and the process for waterproofing a previously constructed footwear article. The invention is particularly suitable for footwear articles that have uppers containing a water impermeable layer such as GORE-TEX® fabric commercially available from W.L. Gore & Associates, Inc. The invention is also suitable for a footwear article that does not have a waterproof upper and where it is desirable for the article to be made waterproof. A two component polyurethane system is utilized in the process. No heating or drying steps are required. In addition, no emissions of volatile organic components result from the use of the polyurethane system. Moreover, the polyurethane system ensures that no void spaces remain in the article which are not covered by the polyurethane which is a problem associated with solvent systems.

The material required for use in the process is a two component polyurethane system similar to that described in U.S. Pat. No. 4,814,412. The preferred material consists of component A which is a polyisocyanate with an isocyanate functionality of 2.7 or less and component B which is a polyol blend having a total hydroxyl functionality of 2.7 or less and having a viscosity of less than 2000 cps. which further consists of a polyether or polyester diol or triol having a molecular weight of about 2000–3000, a diol or triol having a molecular weight of less than 200, and a catalyst for the isocyanate-hydroxyl reaction to form the polyurethane, the catalyst being present in an amount sufficient to provide gelling at greater than about 2 minutes and less than about 10 minutes. Neither of these components is a solvent nor behaves as a solvent for the other.

The two component polyurethane system is a significant improvement over existing technology which includes solvent based systems. For example, solvent based resins are linear polymer systems. Once the solvent is evaporated or otherwise removed, the remaining dried components are more susceptible to thermal and solvent degradation. This solvent-free system however is designed to involve a cross-linking reaction thereby causing the cured components to be more resistant to heat and solvents.

The solvent-free polyurethane system when applied is self-curing at room temperature. No heat need be applied. The time for the system to cure is relatively short and requires less than about 10 minutes. If the footwear construction to which the polyurethane system is applied contains an intermediate layer such as expanded porous polytetrafluoroethylene (PTFE) membrane to which the polyurethane system is in contact, the polyurethane is capable of wetting into the expanded PTFE microstructure of polymeric nodules interconnected with fibrils. Once cured, the wetted expanded PTFE attains the final properties of the polyurethane allowing the membrane to be more abrasion resistant. The wetted expanded PTFE also improves the sealing of this layer within the shoe construction in areas where the layer is in contact with other shoe parts.

Care however, must be taken when the two component polyurethane system is prepared in that the ratio of the two components by weight must be exact in order to achieve a proper cure. The material should also be used in a well-ventilated area to prevent exposure of airborne isocyanates.

The invention is best understood by reference to the accompanying drawings. FIG. 1 is a cross-sectional sketch of a finished footwear article which has not yet been made waterproof. The upper 1 is comprised of an outside layer 2, an interior layer 4, and as shown in this embodiment, an intermediate layer 3 which is comprised of a waterproof material. The lower region of the upper 1 is folded around the insole 6. The folded portion of the upper may be attached to the insole as shown in this figure with a layer of cement 5. An outer sole 10 is also attached by conventional methods. A foot bed 7 (shown in FIG. 4) may also be positioned over the insole 6.

Figure 1A:
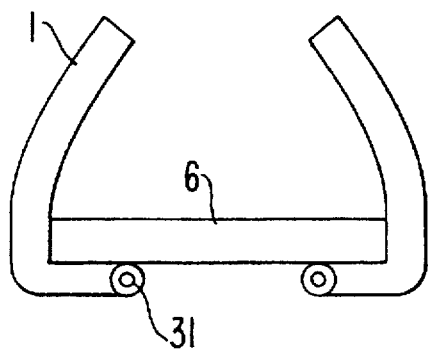
FIG. 1a is a schematic cross-sectional view showing a string lasting construction.
Figure 1B:
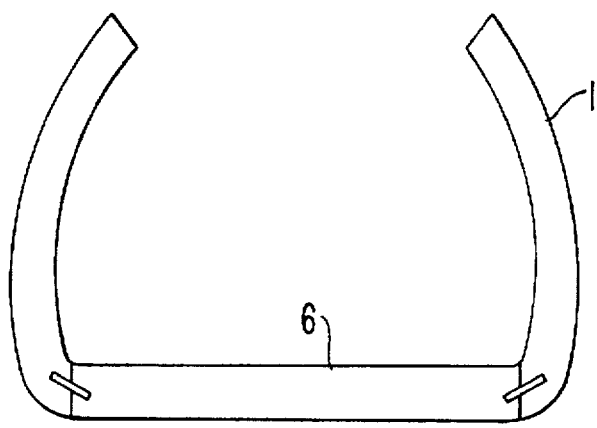
FIG. 1b is a schematic cross-sectional view showing a slip-lasting construction.
Figure 1C:
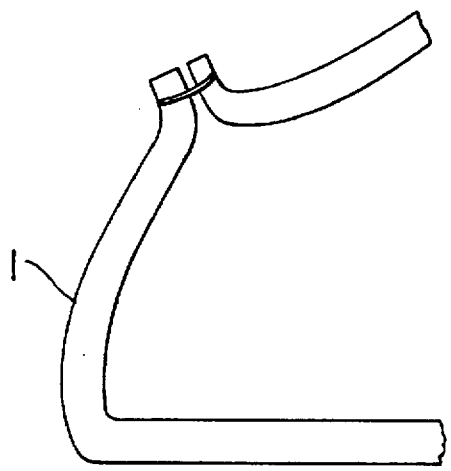
FIG. 1c is a schematic cross-sectional view showing a mocassin-lasting construction.
Figure 1D:
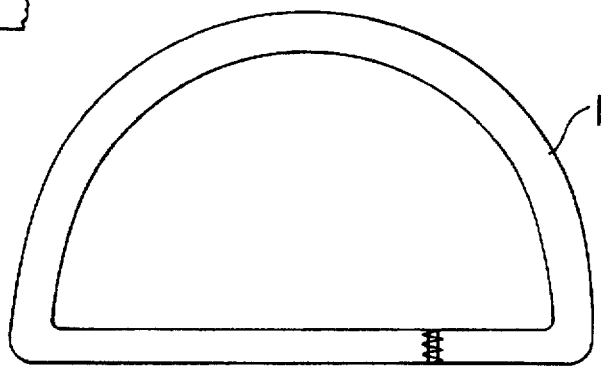
FIG. 1d is a schematic cross-sectional view showing a tubular construction.

Alternative lasting processes and methods are all suitable for use with this invention. These lasting processes include but are not limited to string lasting (wherein a string 31 is attached to an upper in the area of contact with the insole which is then drawn around the insole as shown in FIG. 1a), flat lasting (wherein the upper is folded around and below the insole as shown in FIG. 1), slip lasting (wherein the upper is folded to meet and be flush with the insole as shown in FIG. 1b), mocassin lasting (wherein the upper is a continuous length over which an insole may optionally be placed as shown in FIG. 1c) and tubular lasting (where the upper extends to cover the bottom and joined by one or more seams along the bottom as shown in FIG. 1d).

Different methods of attaching or adhering together the different parts of the shoe including for example stitching, tacking or nailing may also be used.

When these footwear articles are constructed, entryways are created for water and other undesired materials to enter into the interior of the article. In addition to the entryways created by the stapling, tacking, and sewing, entry ways also appear in connecting regions where parts of the footwear article meet such as the area circled in FIG. 1. The inventive process enables that all of these entryways be occluded thereby rendering the treated footwear article waterproof.

The two component polyurethane system may be applied so that it provides a topical layer to the constructed shoe or may be applied and treated so that it is impregnated and forced within different parts of the actual footwear article.

Figure 2:
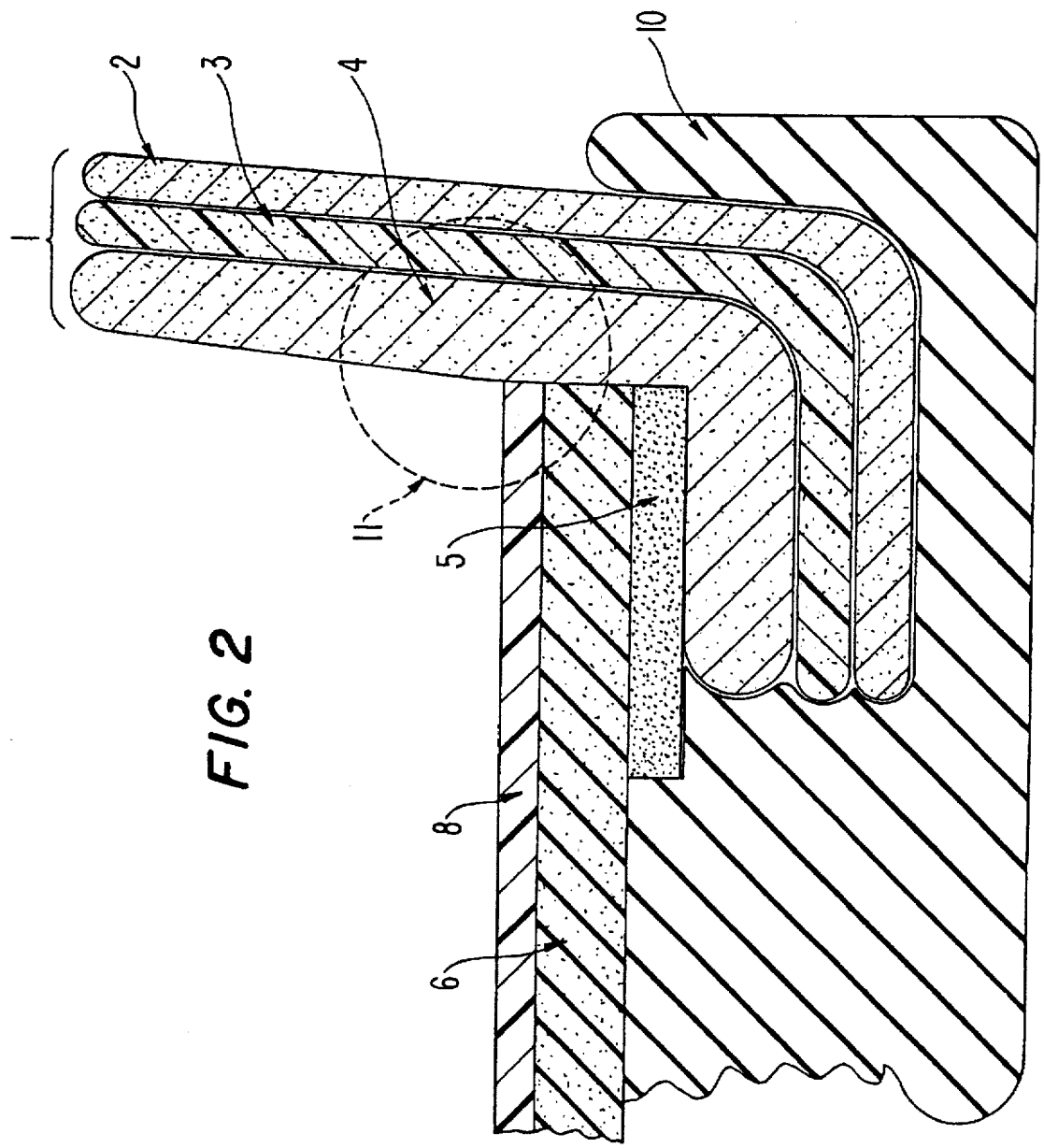
FIG. 2 is a schematic cross-sectional view of a footwear article wherein the inventive process has been applied to create a layer of waterproof material above the insole.

FIG. 2 shows a schematic cross-section of a finished footwear article in which the waterproof two component polyurethane system 8 is applied over an insole 6. In this situation, the insole 6 is generally not waterproof. The liquid system 8 is poured into the interior of the shoe and allowed to spread across the entire surface of the insole to form a separate layer as shown in FIG. 2.

Figure 2A:
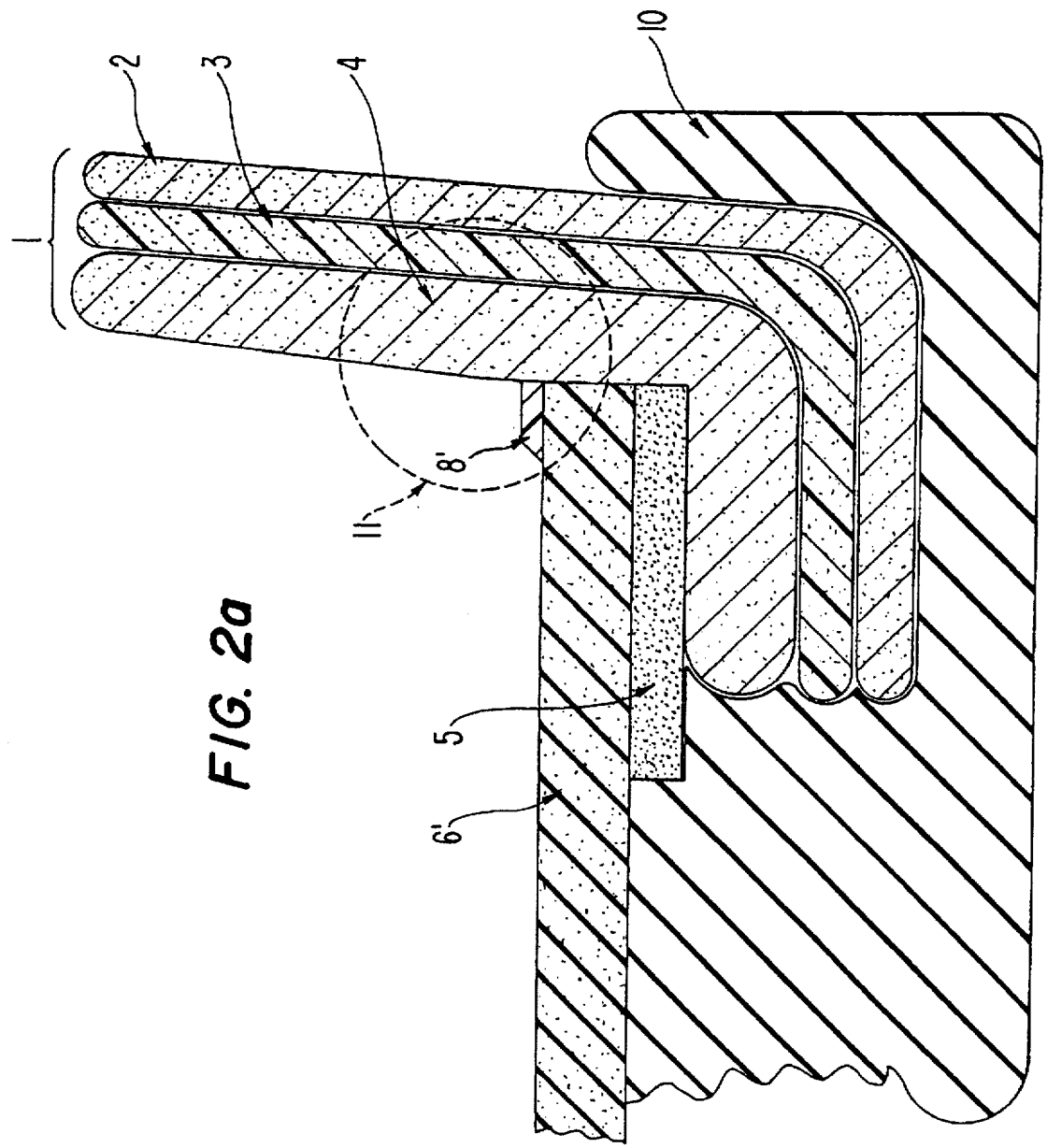
FIG. 2a is a schematic cross-section of a footwear article wherein the waterproof polyurethane system is applied only in the connecting region between the insole and upper.

Alternatively and as shown in FIG. 2a, where a waterproof insole 6' is used, the liquid polyurethane system 8' may be applied only in the connecting region 11 where the insole 6 is in contact with the upper 1. For either of these situations, the two component polyurethane system creates a waterproof seal in areas where water was most likely to enter the shoe.

Figure 3:
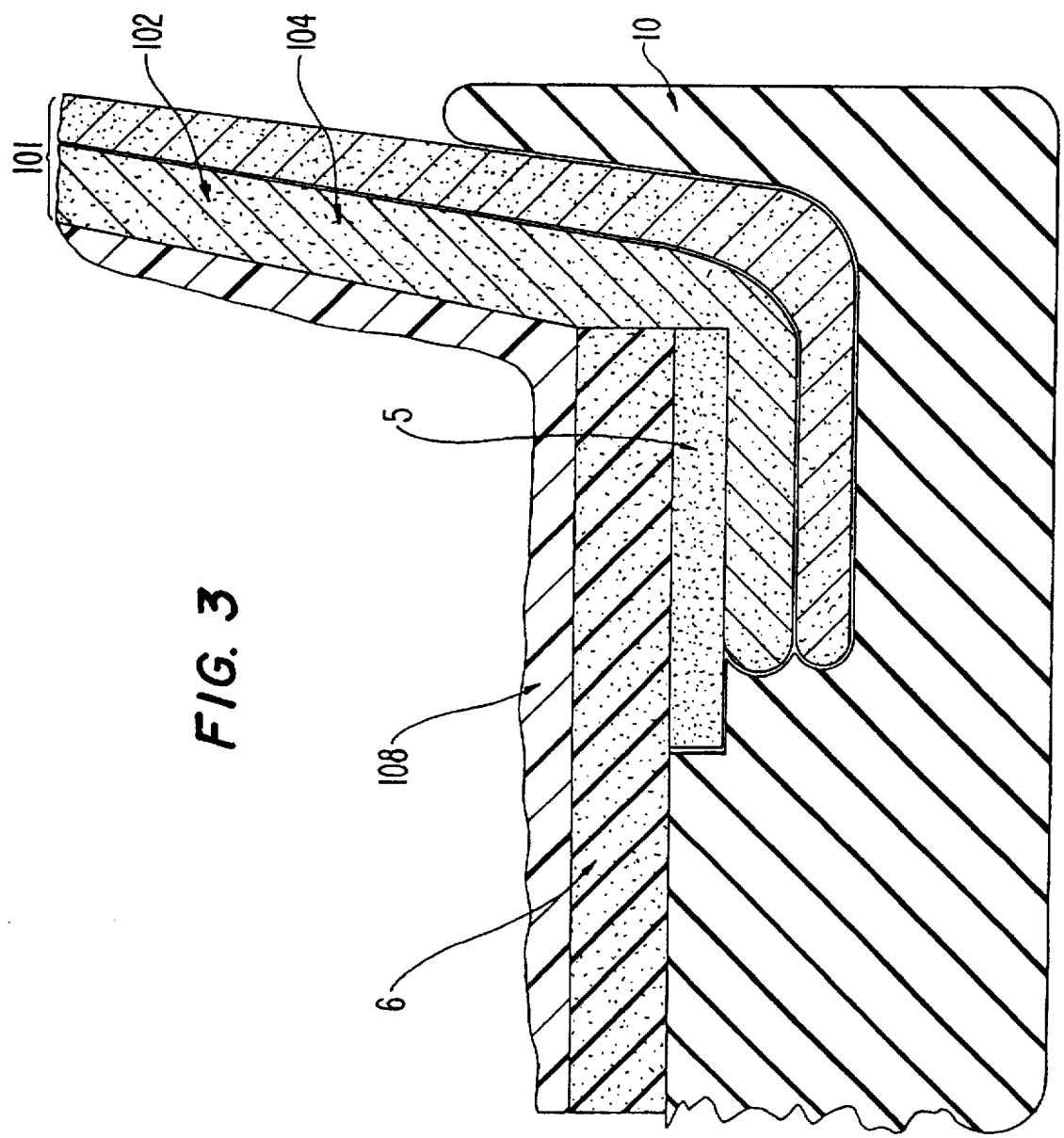
FIG. 3 is a schematic cross-sectional view of a footwear article wherein the inventive process has been applied to create a layer of waterproof material above the insole as well as a layer of the upper.

Another embodiment provides for a polyurethane layer 8 to be created not only on top of the insole but also be applied so as to form a layer to the upper, as shown in FIG. 3. As can be seen in FIG. 3, the original footwear article possessed an upper 101 comprising only an inner layer 104 and an outer layer 102. Neither of these layers had the desired waterproofness. The polyurethane system 108' may be introduced into the interior of the article and rotated and oriented so as to coat not only the insole of the shoe but also the upper as well. The resulting product as shown in FIG. 3 has a newly created waterproof layer of the polyurethane system 108 both on the insole and upper.

Figure 4:
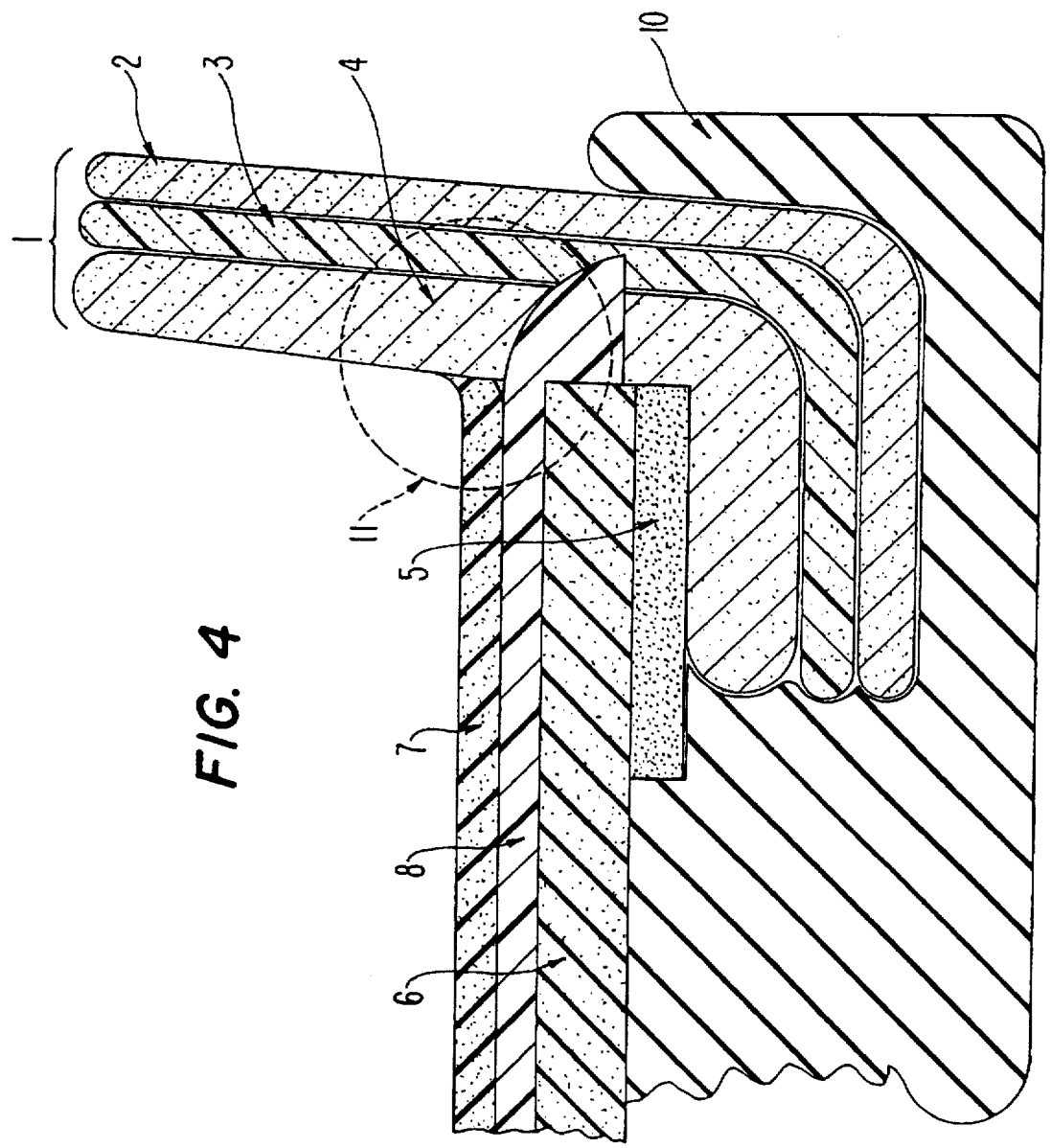
FIG. 4 is a schematic cross-sectional view of a footwear article wherein the waterproof material has impregnated an inner layer of the upper in a connecting region between the insole and upper.
Figure 4A:
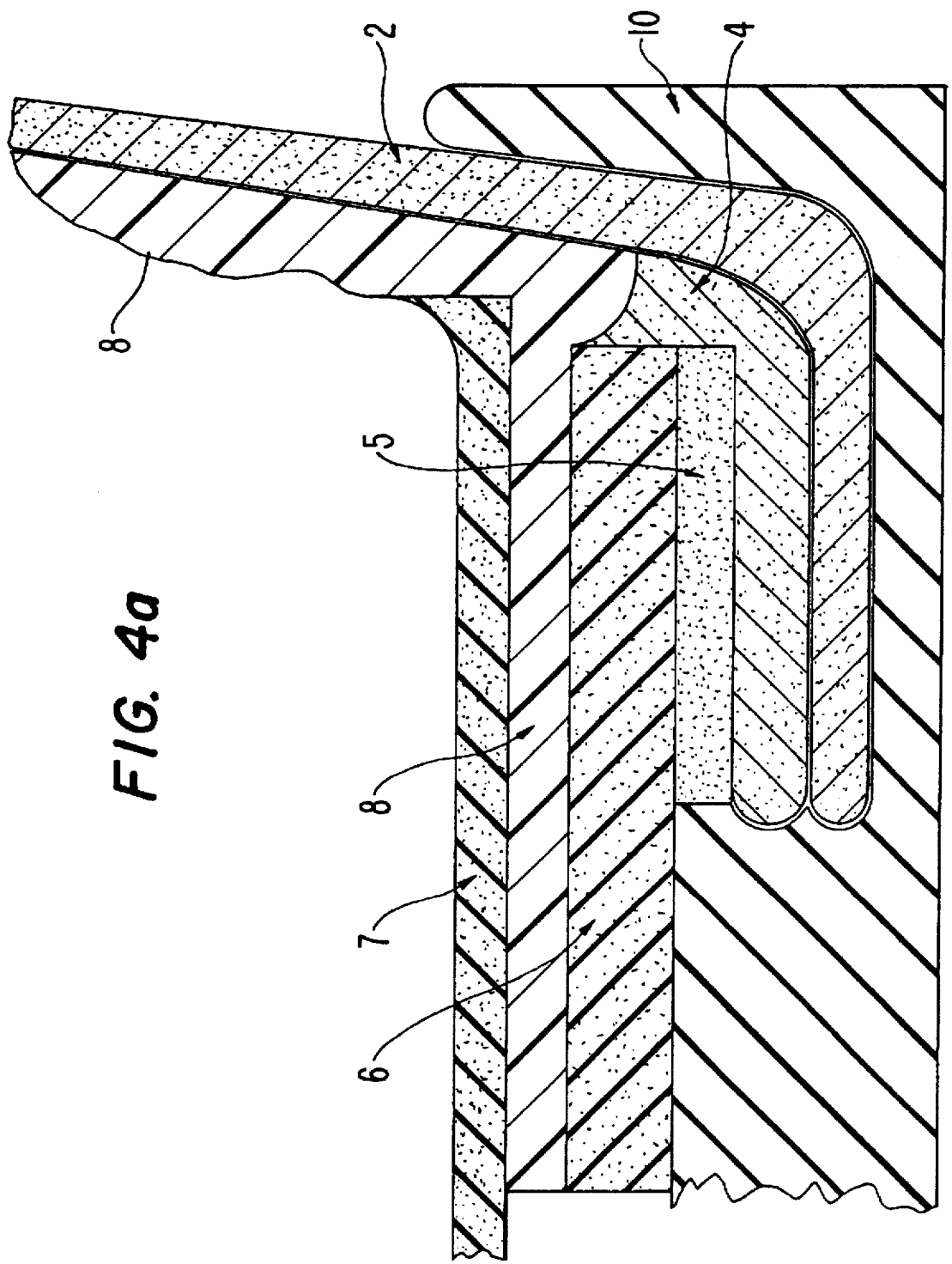
FIG. 4a is a schematic cross-sectional view of a footwear article wherein the waterproof material has formed a layer on top of the insole and has impregnated the inner layer of the upper.

The two component polyurethane system may also be applied so as to impregnate different layers of the shoe. This is accomplished by either applying mechanical forces or providing alternate designs in shoe construction and selection of materials so as to cause the polyurethane to flow into areas of the shoe and penetrate the different layers. FIG. 4 shows a finished footwear article wherein the two component polyurethane system 8 was applied so that it impregnated layers of the upper including the inner layer 4 and waterproof layer 3 only in the connecting region 11. FIG. 4a shows a finished footwear article 104 having a waterproof layer 3 wherein the two component polyurethane system 8 was applied so that it impregnated the entire inner layer 4 as well as formed a waterproof layer over the insole 6 thereby rendering what was once a non-waterproof shoe now waterproof.

Many different techniques may be employed to cause the polyurethane two component system to flow into and impregnate the various layers of the footwear article. One method includes simply pouring the viscous polyurethane into the shoe and rotating and orienting it so that the gravitational forces act on the liquid polyurethane and induce the flow of materials into the desired areas. This technique may be facilitated by selecting flow properties of the two component polyurethane system so that it flows easily into the interior of the footwear article and penetrates the desired layers. The material is selected such that at the interface between the inner layer of the upper and the insole, the liquid has an affinity to materials of the upper. Low viscosity liquids and interior materials with high surface energies promote spontaneous wetting thus causing the liquid to penetrate through the inner layers. As can be seen for example in FIGS. 4 and 4a, the polyurethane liquid was able to penetrate inner layer 4 to reach either the intermediate layer 3 or the outer layer 2.

Other methods of causing the polyurethane to impregnate various layers of a footwear article include application of mechanical forces onto the liquid to push it through to the various layers. This may be accomplished by injecting the polyurethane into the shoe at pressures sufficiently high enough to cause penetration.

Figure 5:
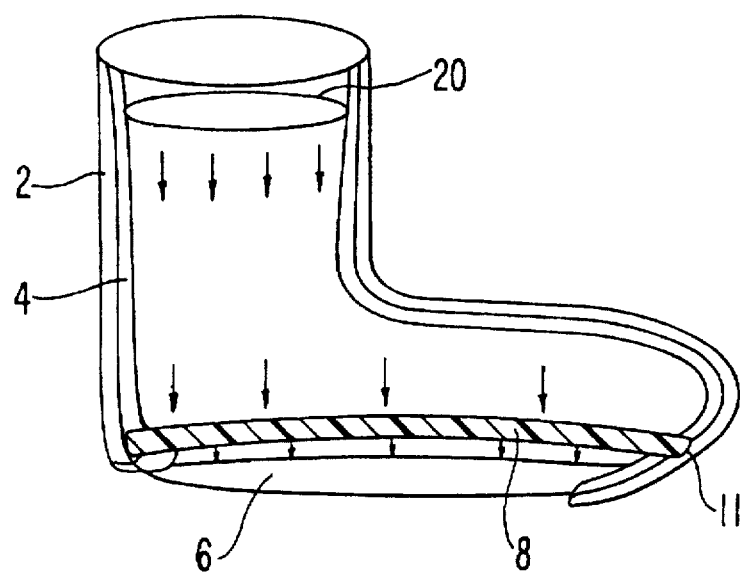
FIG. 5 is a schematic cross-sectional view of an inflatable bladder as used within a footwear article to enhance impregnation of the polyurethane material into various shoe layers.
Figure 6:
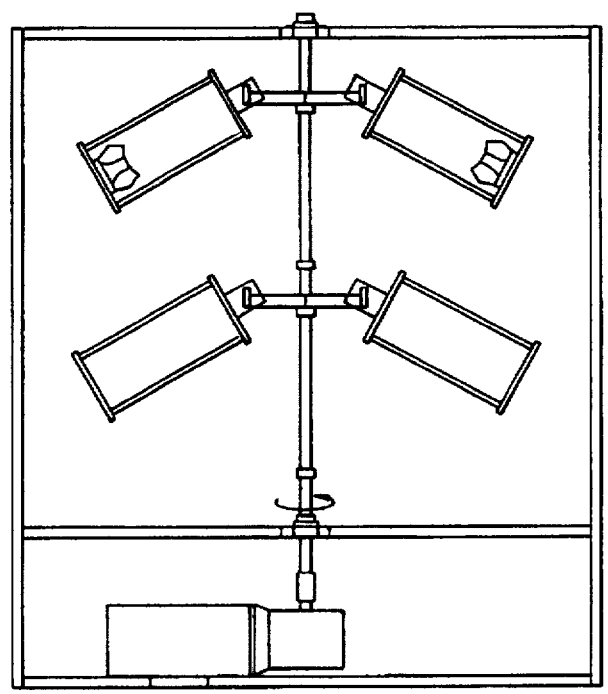
FIG. 6 is a schematic cross-sectional view of a centrifuge suitable for use with the invention.

An inflatable bladder 20 such as that shown in FIG. 5 may be utilized in applying this force onto the polyurethane liquid. This technique entails first pouring the liquid into the shoe and then inserting the bladder into the shoe so that when the bladder is inflated, air pressure is introduced thereby causing increased pressure as shown by the arrows to force the liquid polyurethane into the desired regions.

Another method suitable for impregnating the liquid into connecting regions of a footwear article includes use of a centrifuge apparatus as described in U.S. Pat. No. 5,329,807. This method includes putting a footwear article containing the liquid polyurethane system into the centrifuge apparatus and then operating the apparatus so that centripetal forces act within the interior of the article forcing any liquid within to spread out and impregnate any porous or unsealed regions of the footwear article.

Other techniques that enhance penetration of the polyurethane liquid into the layers of the footwear article include for example utilizing a mechanical press to push the liquid into entryways or creating a vacuum which actually sucks the polyurethane liquid into the layers.

Figure 7:
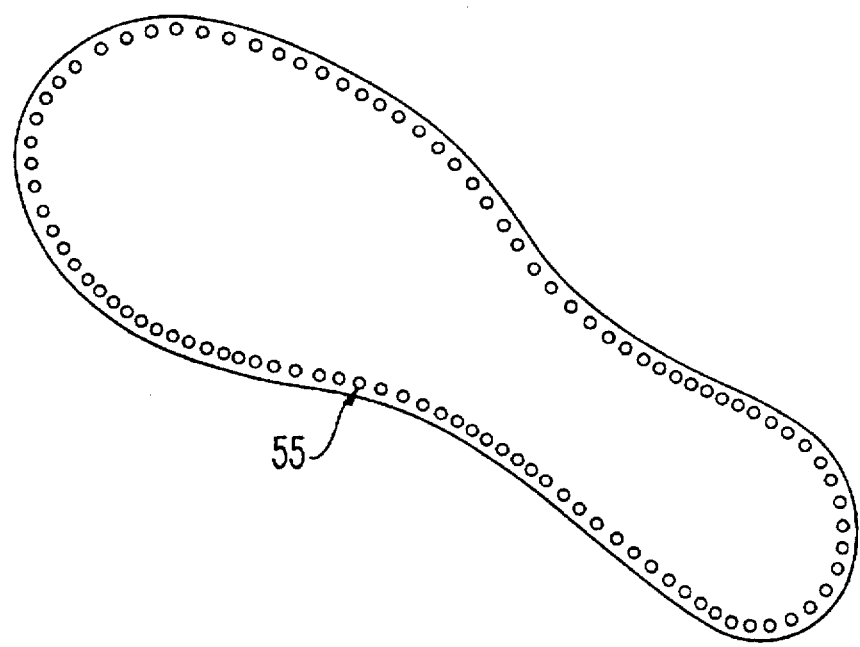
FIG. 7 is a top view of a footwear article insole layer having void spaces through which the liquid polyurethane may flow.
Figure 7A:
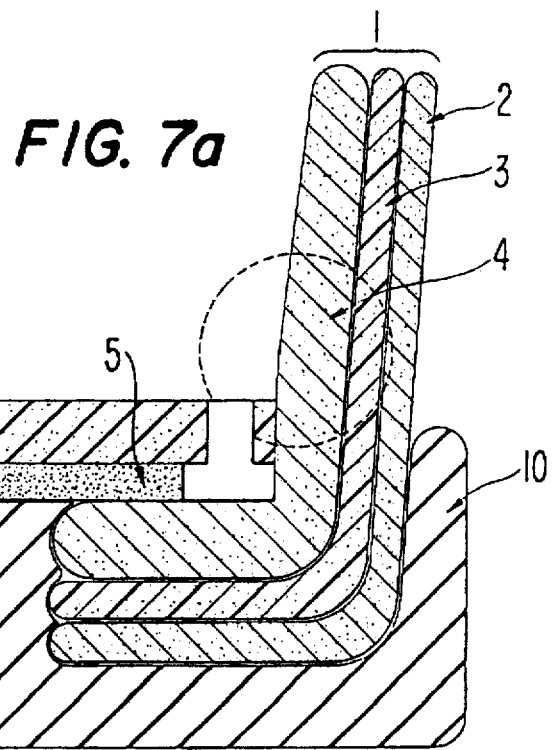
FIG. 7a is a schematic cross-section of the footwear article having a void space through which the liquid polyurethane may flow.

Additionally, the footwear article itself may be modified so as to cause the polyurethane two component system to flow into and penetrate predetermined areas. One technique involves creating void spaces 55 within the insole 6 so as to provide a low resistant path through which the liquid polyurethane is able to pass as shown in top view in FIG. 7 and in side view in FIG. 7a. The liquid polyurethane passes through these spaces and reaches the inner layers of the upper region which has been tucked under the insole 6.

Figure 8:
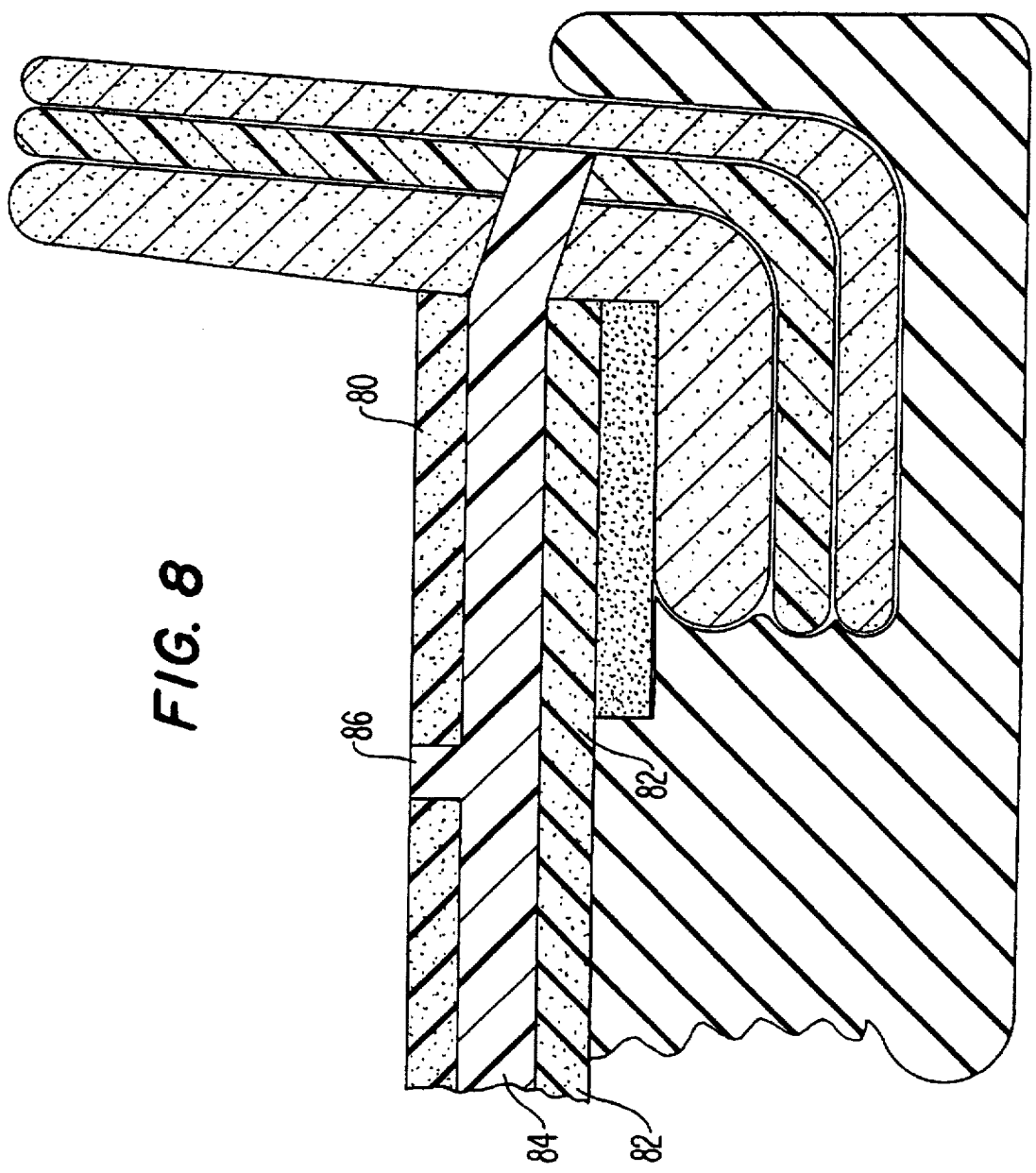
FIG. 8 is a schematic cross-section of the modified footwear article having a composite insole structure.

Other modifications of the footwear article include using a composite insole structure as shown in cross-section in FIG. 8 wherein two insoles are employed having a highly absorbant medium sandwiched between them. This type of footwear configuration is preferred for footwear articles where visible exposure of the polyurethane system or penetration into undesired areas is of primary concern. In this embodiment, two insoles 80 and 82 are positioned in parallel with each having a space of absorbant material 84 between them to limit the seepage of the polyurethane system. The absorbant material may be any material that is spontaneously wetted by the two part polyurethane system. Suitable absorbant materials include non-woven and woven materials such as cottons, nylons, polyesters and blends thereof; open celled foams; corks; and polyolefin materials. Alternatively, a void space or a combination void space and absorbant material can be used. As can be seen in FIG. 8, a bore 86 is placed in the upper insole 82 through which the two component polyurethane system in liquid form is introduced.

Once the liquid material has coated the insole of any of the above described embodiments and has reached the desired areas of the upper, the material is allowed to cure at room temperature to a hardened state.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

We claim:

1. A waterproof footwear article comprising:
   (a) an upper comprising multilayers in which an intermediate layer is waterproof;
   (b) an insole having a top surface and a bottom surface positioned and constructed such that a lower region of the upper is attached to a bottom edge of the insole and wherein end regions of the insole are in contact with the upper in a connecting region;
   (c) a layer of a two component polyurethane system forming a layer covering at least a portion of the insole top surface in the connecting region;
   (d) said two component polyurethane system impregnating a portion of the waterproof intermediate layer of the upper in said connecting region;
   (e) an outer sole covering the bottom surface of the insole.

2. A waterproof footwear article as described in claim 1 wherein the layer of two component polyurethane system covers the complete top surface of the insole.

3. A waterproof footwear article of claim 1 wherein the polyurethane system further comprises a polyisocyanate with an isocyanate functionality of 2.7 or less and a polyol blend having a total hydroxyl functionality of 2.7 or less and a viscosity of less than 2000 CPS, which further consists of a linear polyether or polyester diol having a molecular weight of 2000 to 3000, a diol or triol having a molecular weight of less than 200 and a catalyst for the isocyanate-hydroxyl reaction.

* * * * *